United States Patent
Whipple et al.

(10) Patent No.: US 6,605,674 B1
(45) Date of Patent: Aug. 12, 2003

(54) STRUCTURALLY-MODIFIED POLYMER FLOCCULANTS

(75) Inventors: Wesley L. Whipple; Chidambaram Maltesh, both of Naperville; Cathy C. Johnson, Geneva; Ananthasubramanian Sivakumar; Tracey M. Guddendorf, both of Aurora; Angela P. Zagala, Naperville, all of IL (US)

(73) Assignee: Ondeo Nalco Company, Naperville, IL (US)

( * ) Notice: Subject to any disclaimer, the term of this patent is extended or adjusted under 35 U.S.C. 154(b) by 0 days.

(21) Appl. No.: 09/606,581

(22) Filed: Jun. 29, 2000

(51) Int. Cl.$^7$ .................... C08F 265/10; C08J 3/24
(52) U.S. Cl. .................... 526/78; 526/82; 525/244; 525/313; 525/329.4; 525/329.7; 525/329.8; 525/329.9
(58) Field of Search ................. 525/244, 313, 525/329.4, 329.7, 329.8, 329.9; 526/78, 82

(56) References Cited

U.S. PATENT DOCUMENTS

| | | | |
|---|---|---|---|
| 4,913,775 A | | 4/1990 | Langley et al. |
| 4,950,725 A | | 8/1990 | Flesher et al. |
| 5,110,883 A | * | 5/1992 | Garner .................... 526/84 |
| 5,171,783 A | * | 12/1992 | Garner .................... 524/801 |
| 5,393,381 A | | 2/1995 | Hund et al. |
| 5,518,634 A | * | 5/1996 | Pillai et al. .................... 209/5 |
| 5,601,723 A | * | 2/1997 | Kirk et al. .................... 210/701 |
| 5,945,494 A | | 8/1999 | Neff et al. |
| 6,103,839 A | * | 9/2000 | Patel et al. .................... 526/65 |
| 6,294,622 B1 | * | 9/2001 | Barajas et al. .................... 526/292.2 |

FOREIGN PATENT DOCUMENTS

| | | |
|---|---|---|
| EP | 0 202 780 B1 | 2/1989 |
| EP | 0 363 024 A1 | 4/1990 |
| EP | 0 374 458 A3 | 6/1990 |

* cited by examiner

*Primary Examiner*—David W. Wu
*Assistant Examiner*—K C Egwim
(74) *Attorney, Agent, or Firm*—Michael B. Martin; Thomas M. Breininger

(57) ABSTRACT

This invention is directed to structurally-modified water-soluble polymers prepared by initiating polymerization of an aqueous solution of monomers under free radical polymerization conditions to form a polymer solution and adding at least one structural modifier to the polymer solution after at least 30% polymerization of the monomers has occurred, and to use of the water-soluble cross-linked polymers as flocculating agents.

8 Claims, No Drawings

STRUCTURALLY-MODIFIED POLYMER FLOCCULANTS

TECHNICAL FIELD

This invention is directed to structurally-modified water-soluble polymers prepared by initiating polymerization of an aqueous solution of monomers under free radical polymerization and adding at least one modifier after at least 30% polymerization of the monomers has occurred, and to the use of the polymers as flocculants.

BACKGROUND OF THE INVENTION

Water-soluble polymeric flocculants are commonly used for clarifying suspensions of organic matter of a proteinaceous or cellulosic nature such as those found in sewage and industrial plant treatment effluents or in paper mills.

These suspended materials are hydrophilic in nature and often have specific gravities quite close to the aqueous liquors in which they are suspended, and differ in a marked way with more hydrophobic mineral suspensions in that they are frequently much more difficult to flocculate economically with chemical reagents prior to a physical dewatering step such as filtration, flotation, sedimentation or dewatering. These difficulties are particularly noticeable when higher proportions of suspended matter are present, commonly involving concentrations of 0.5 percent by weight and upwards where the suspensions take on a paste-like consistency and are commonly described as sludges.

It is well known that the clarification or dewatering of sewage and industrial sludges and similar organic suspensions may be aided by chemical reagents, added in order to induce a state of coagulation or flocculation which facilitates the process of solid/liquid or liquid/liquid separation from water. For this purpose, lime or salts of iron or aluminum have been utilized. More recently synthetic polyelectrolytes, particularly certain cationic and anionic copolymers of acrylamide, have been found to be of interest.

While strictly mechanical means have been used to effect solids/liquid separation, modem methods often rely on mechanical separation techniques that are augmented by synthetic and natural polymeric materials to accelerate the rate at which solids can be removed from water. These processes include the treatment of raw water with cationic coagulant polymers that settle suspended inorganic particulates and make the water usable for industrial or municipal purposes. Other examples of these processes include the removal of colored soluble species from paper mill effluent wastes and the use of polymeric flocculants for the treatment of industrial water, as sludge conditioners for the treatment of municipal water systems, as retention and drainage aids in the manufacture of paper, as chemicals for recovering useful and valuable substances from white water in the papermaking process and in emulsion breaking.

A benchmark test for evaluating the effectiveness of a flocculant is the so-called drainage test in which the polymer is added to sludge and mixed so that the polymer flocculates the sludge. The mixture is then poured through a belt filter press cloth and the rate at which water drains is taken as a measure of polymer performance.

Regarding the mechanism of separation processes, particles in nature have either a cationic or anionic charge. Accordingly, these particles often are removed by a water-soluble coagulant or flocculant polymer having a charge opposite to that of the particles. This is referred to as a polyelectrolyte enhanced solids/liquid separation process, wherein a water-soluble or dispersible ionically charged polymer is added to neutralize the charged particles or emulsion droplets to be separated. The dosage of these polymers is critical to the performance of the process. Too little ionically charged polymer, and the suspended particles will not be charge neutralized and will thus still repel each other. Too much polymer, and the polymer will be wasted, or worse, present a problem in and of itself.

Notwithstanding the variety of commercially available polymers that have been found to be capable of flocculating or coagulating sludges, there are various circumstances which tend to limit the usefulness of these reagents. While for certain sludges economical treatments with these known reagents are feasible, more often sludges require very high and cost-ineffective dosages of reagents for successful treatment. Moreover, variations often occur in sludge from any one source. For example, variations in the supply of material to the waste water/sludge/paper furnish process water and/or in the oxidizing conditions that may be involved in the production of these waters lead to a variety of particle types which must be removed. Furthermore, it is not uncommon to encounter sludges that are, for some reason, not amenable to flocculation by any of the known polymeric flocculating agents.

Therefore, there is a need for an improved family of polymers that provide better drainage at lower doses in sludge dewatering. Likewise, there is a continuing need for treatments to increase the efficiency of pulp and paper manufacture.

EP 202,780 discloses particulate cross-linked copolymers of acrylamide with at least 5 mole percent dialkylaminoalkyl acrylate for use as flocculants in high-shear applications.

The addition of a cross-linking agent both at the beginning, and during the polymerization process under conditions such that its availability for reaction is substantially constant throughout the process is disclosed in U.S. Pat. No. 4,950,725.

EP 374,458 discloses water-soluble branched high molecular weight cationic flocculants formed from monomers polymerized in the presence of chain transfer agents such as isopropanol and branching agents such as methylene bisacrylamide, in which the chain transfer agent is added to prevent cross linking. Cross linking can render the polymer insoluble in water.

Addition of chain transfer agent at the conclusion of polymerization of a DADMAC/acrylamide copolymer to produce a linear higher molecular weight copolymer is disclosed in EP 363,024.

U.S. Pat. No. 4,913,775 discloses use of substantially linear cationic polymers such as acrylamide/dimethylaminoethyl acrylate methyl chloride quaternary salt copolymers and bentonite as additives in pulp or paper manufacture.

U.S. Pat. No. 5,393,381 discloses use of a branched cationic polyacrylamide powder such as an acrylamide/dimethylaminoethyl acrylate quaternary salt copolymer and bentonite for paper or cardboard manufacture.

SUMMARY OF THE INVENTION

We have discovered that the late stage addition to a polymerization reaction of a structural modifier as described herein results in formation of a more effective, structurally-modified flocculant. When the structural modifier is a chain-transfer agent, the resulting water-soluble polymers typically have a faster rate of solubilization, higher reduced specific viscosities and are more active than unmodified analogs. This is applicable to cationic, anionic, or nonionic polymers, synthesized using water-in-oil emulsion, dispersion, or gel polymerization techniques.

Accordingly, in its principal aspect, this invention is directed to a water-soluble polymer prepared by initiating polymerization of an aqueous solution of monomers under free radical polymerization conditions to form a polymer solution and adding at least one structural modifier to the polymer solution after at least 30% polymerization of the monomers has occurred.

DETAILED DESCRIPTION OF THE INVENTION

Definitions of Terms

As used herein, the following abbreviations and terms shall have the following meanings.

"AcAm" for acrylamide.

"DADMAC" for diallyldimethylammonium chloride.

"DMAEA" for dimethylaminoethyl acrylate.

"DMAEM" for dimethylaminoethyl methacrylate.

"DMAEA. BCQ" for dime thylaminoethyl acrylate, benzyl chloride quaternary salt.

"DMAEA. MCQ" for dimethylaminoethyl acrylate, methyl chloride quaternary salt.

"EDTA. 4Na$^+$" for ethylenediaminetetraacetic acid, tetrasodium salt.

"Alfonic® 1412-60" is a ethoxylated linear alcohol (60% ethylene oxide), available from Vista Chemical Co., Houston, Tex.

"Span 80" for sorbitan monooleate available from ICI Specialty Chemicals, Wilmington, Del.

"Triton® N-101 " for nonylphenoxy polyethoxy ethanol, available from Rohm and Haas Co., Philadelphia, Pa.

"Tween 61 " for POE (4) sorbitan monostearate, available from ICI Specialty Chemicals, Wilmington, Del.

"AIBN" for 2,2'-azobis(isobutyronitrile), available from E. I. duPont Nemours & Co. Inc.; Wilmington, Del.

"AIVN" for 2,2'-azobis(2,4-dimethylvaleronitrile), available from E. I. duPont Nemours & Co. Inc.; Wilmington, Del.

"POE" for polyoxyethylene.

"RSV" stands for Reduced Specific Viscosity. Within a series of polymer homologs which are substantially linear and well solvated, "reduced specific viscosity (RSV)" measurements for dilute polymer solutions are an indication of polymer chain length and average molecular weight according to Paul J. Flory, in "*Principles of Polymer Chemistry*", Cornell University Press, Ithaca, N.Y., ® 1953, Chapter VII, "*Determination of Molecular Weights*", pp. 266–316. The RSV is measured at a given polymer concentration and temperature and calculated as follows:

$$RSV = \frac{[(\eta/\eta_o) - 1]}{c}$$

-continued $\eta$ = viscosity of polymer solution $\eta_o$ = viscosity of solvent at the same temperature $c$ = concentration of polymer in solution.

The units of concentration "c" are (grams/100 ml or g/deciliter). Therefore, the units of RSV are dl/g. In this patent application, a 1.0 molar sodium nitrate solution is used for measuring RSV, unless specified. The polymer concentration in this solvent is 0.045 g/dl. The RSV is measured at 30° C. The viscosities $\eta$ and $\eta_o$ are measured using a Cannon Ubbelohde semimicro dilution viscometer, size 75. The viscometer is mounted in a perfectly vertical position in a constant temperature bath adjusted to 30±0.02° C. The error inherent in the calculation of RSV is about 2 dl/grams. When two polymer homologs within a series have similar RSV's that is an indication that they have similar molecular weights.

"IV" stands for intrinsic viscosity, which is RSV extrapolated to the limit of infinite dilution, infinite dilution being when the concentration of polymer is equal to zero.

"Based on formula" means the amount of reagent added based on the total formula weight.

"Based on polymer active" and "based on monomer" mean the amount of a reagent added based on the level of vinylic monomer in the formula, or the level of polymer formed after polymerization, assuming 100% conversion.

"Raw water" means water from natural geographical sources including rivers, lakes, well water, rain water, and the like.

"Process water" means water used in a process such as a manufacturing process (paper machine), steel production, chemical production processes, refinery processes, food production processes (i.e., sugar process), and the like.

"Waste water" means water from a manufacturing process, municipal waste or other waters which are required to be treated prior to discharge to a receiving stream, lake or other water way.

"Papermaking process" means a method of making paper products from pulp comprising forming an aqueous cellulosic papermaking furnish, draining the furnish to form a sheet and drying the sheet. The steps of forming the papermaking furnish, draining and drying may be carried out in any conventional manner generally known to those skilled in the art. Conventional coagulants, conventional flocculants, microparticles, alum, cationic starch or a combination thereof may be utilized as adjuncts with the structurally-modified water-soluble polymer of this invention, though it must be emphasized that no adjunct is required for effective retention and drainage activity.

"Monomer" means a polymerizable allylic, vinylic or acrylic compound. The monomer may be anionic, cationic or nonionic. Vinyl monomers are preferred, acrylic monomers are more preferred.

Representative non-ionic, water-soluble monomers include acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, N-t-butylacrylamide, N-methylolacrylamide, and the like.

Representative anionic monomers include acrylic acid, and it's salts, including, but not limited to sodium acrylate, and ammonium acrylate, methacrylic acid, and it's salts, including, but not limited to sodium methacrylate, and ammonium methacrylate, 2-acrylamido-2-methylpropanesulfonic acid (AMPS), the sodium salt of AMPS, sodium vinyl sulfonate, styrene sulfonate, maleic acid, and it's salts, including, but not limited to the sodium salt, and ammonium salt, sulfonate itaconate, sulfopropyl acrylate or methacrylate or other water-soluble forms of these or other polymerisable carboxylic or sulphonic acids. Sulfomethylated acrylamide, allyl sulfonate, sodium vinyl sulfonate, itaconic acid, acrylamidomethylbutanoic acid, fumaric acid, vinylphosphonic acid, vinylsulfonic acid, allylphosphonic acid, sulfomethyalted acryamide, phosphonomethylated acrylamide, and the like.

Representative cationic monomers include dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride. Alkyl groups are generally $C_{1-4}$ alkyl.

"Structural modifier" means an agent that is added to the aqueous polymer solution to control the polymer structure and solubility characteristics. The structural modifier is selected from the group consisting of cross-linking agents and chain transfer agents.

"Chain transfer agent" means any molecule, used in free-radical polymerization, which will react with a polymer radical forming a dead polymer and a new radical. In particular, adding a chain transfer agent to a polymerizing mixture results in a chain-breaking and a concomitant decrease in the size of the polymerizing chain. Thus, adding a chain transfer agent limits the molecular weight of the polymer being prepared. Representative chain transfer agents include alcohols such as methanol, ethanol, 1-propanol, 2-propanol, butyl alcohol, and glycerol, and the like, sulfur compounds such as alkylthiols, thioureas, sulfites, and disulfides, carboxylic acids such as formic and malic acid, and their salts and phosphites such as sodium hypophosphite, and combinations thereof. See Berger et al., "*Transfer Constants to Monomer, Polymer, Catalyst, Solvent, and Additive in Free Radical Polymerization,*" Section II, pp. 81–151, in "*Polymer Handbook,*" edited by J. Brandrup and E. H. Immergut, 3 d edition, John Wiley & Sons, New York (1989) and George Odian, *Principles of Polymerization*, second edition, John Wiley & Sons, New York (1981). A preferred alcohol is 2-propanol. Preferred sulfur compounds include ethanethiol, thiourea, and sodium bisulfite. Preferred carboxylic acids include formic acid and its salts. More preferred chain-transfer agents are sodium hypophosphite and sodium formate.

"Cross-linking agent" or "branching agent" means a multifunctional monomer that when added to polymerizing monomer or monomers results in "cross-linked" polymers in which a branch or branches from one polymer molecule become attached to other polymer molecules. Preferred cross-linkers are polyethylenically unsaturated monomers. Representative preferred cross-linking agents include N,N-methylenebisacrylamide, N,N-methylenebismethacrylamide, triallylamine, triallyl ammonium salts, ethylene glycol dimethacrylate, diethylene glycol dimethacrylate, polyethylene glycol diacrylate, triethylene glycol dimethylacrylate, polyethylene glycol dimethacrylate, N-vinylacrylamide, N-methylallylacrylamide, glycidyl acrylate, acrolein, glyoxal and vinyltrialkoxysilanes such as vinyltrimethoxysilane (VTMS), vinyltriethoxysilane, vinyltris(β-methoxyethoxy)silane, vinyltriacetoxysilane, allyltrimethoxysilane, allyltriacetoxysilane, vinylmethyldimethoxysilane, vinyldimethoxyethoxysilane, vinylmethyldiacetoxysilane, vinyldimethylacetoxysilane, vinylisobutyldimethoxysilane, vinyltriisopropoxysilane, vinyltri-n-butoxysilane, vinyltrisecbutoxysilane, vinyltrihexyloxysilane, vinylmethoxydihexyloxysilane, vinyldimethoxyoctyloxysilane, vinylmethoxydioctyloxysilane, vinyltrioctyloxysilane, vinylmethoxydilauryloxysilane, vinyldimethoxylauryloxysilane, vinylmethoxydioleyoxysilane, and vinyldimethoxyoleyloxysilane. A more preferred vinylalkoxysilane monomer is vinyltrimethoxysilane.

Preferred Embodiments

The water-soluble modified polymers prepared as describe herein may be cationic, anionic or non-ionic. They may be emulsion polymers, dispersion polymers, or gel polymers.

"Emulsion polymer" and "latex polymer" mean a water-in-oil polymer emulsion comprising a cationic, anionic or nonionic polymer according to this invention in the aqueous phase, a hydrocarbon oil for the oil phase and a water-in-oil emulsifying agent. Inverse emulsion polymers are hydrocarbon continuous with the water-soluble polymers dispersed within the hydrocarbon matrix. The inverse emulsion polymers are then "inverted" or activated for use by releasing the polymer from the particles using shear, dilution, and, generally, another surfactant. See U.S. Pat. No. 3,734,873, incorporated herein by reference. Representative preparations of high molecular weight inverse emulsion polymers are described U.S. Pat. Nos. 2,982,749;3,284,393; and 3,734,873. See also, "Mechanism, Kinetics and Modeling of the Inverse-Microsuspension Homopolymerization of Acrylamide," Hunkeler, et al., *Polymer* (1989), 30(1), 127–42; and "Mechanism, Kinetics and Modeling of Inverse-Microsuspension Polymerization: 2. Copolymerization of Acrylamide with Quaternary Ammonium Cationic Monomers," Hunkeler et al., *Polymer* (1991), 32(14), 2626–40.

The aqueous phase is prepared by mixing together in water one or more water-soluble monomers, and any polymerization additives such as inorganic salts, chelants, pH buffers, and the like.

The oil phase is prepared by mixing together an inert hydrocarbon liquid with one or more oil soluble surfactants. The surfactant mixture should have a low HLB, to ensure the formation of an oil continuous emulsion. Appropriate surfactants for water-in-oil emulsion polymerizations, which are commercially available, are compiled in the North American Edition of McCutcheon's *Emulsifiers & Detergents*. The oil phase may need to be heated to ensure the formation of a homogeneous oil solution.

The oil phase is then charged into a reactor equipped with a mixer, a thermocouple, a nitrogen purge tube, and a condenser. The aqueous phase is added to the reactor containing the oil phase with vigorous stirring to form an emulsion. The resulting emulsion is heated to the desired temperature, purged with nitrogen, and a free-radical initiator is added. The reaction mixture is stirred for several hours under a nitrogen atmosphere at the desired temperature. Upon completion of the reaction, the water-in-oil emulsion polymer is cooled to room temperature, where any desired post-polymerization additives, such as antioxidants, or a high HLB surfactant (as described in U.S. Pat. No. 3,734, 873) may be added.

The resulting emulsion polymer is a free-flowing liquid. An aqueous solution of the waterin-oil emulsion polymer can be generated by adding a desired amount of the emulsion polymer to water with vigorous mixing in the presence of a high-HLB surfactant (as described in U.S. Pat. No. 3,734, 873).

"Dispersion polymer" means a dispersion of fine particles of polymer in an aqueous salt solution which is prepared by polymerizing monomers with stirring in an aqueous salt solution in which the resulting polymer is insoluble. See U.S. Pat. Nos. 5,708,071; 4,929,655; 5,006,590; 5,597,859; 5,597,858 and European Patent nos. 657,478 and 630,909.

In a typical procedure for preparing a dispersion polymer, an aqueous solution containing one or more inorganic or hydrophobic salts, one or more water-soluble monomers, any polymerization additives such as processing aids, chelants, pH buffers and a water-soluble stabilizer polymer is charged to a reactor equipped with a mixer, a thermocouple, a nitrogen purging tube, and a water condenser. The monomer solution is mixed vigorously, heated to the desired temperature, and then a water-soluble initiator is added. The solution is purged with nitrogen while maintaining temperature and mixing for several hours. After this time, the mixture is cooled to room temperature, and any post-polymerization additives are charged to the reactor. Water continuous dispersions of watersoluble polymers are free flowing liquids with product viscosities generally 100–10,000 cP, measured at low shear.

In a typical procedure for preparing gel polymers, an aqueous solution containing one or more water-soluble monomers and any additional polymerization additives such as chelants, pH buffers, and the like, is prepared. This mixture is charged to a reactor equipped with a mixer, a thermocouple, a nitrogen purging tube and a water condenser. The solution is mixed vigorously, heated to the desired temperature, and then one or more water-soluble free radical polymerization initiators are added. The solution is purged with nitrogen while maintaining temperature and mixing for several hours. Typically, the viscosity of the solution increases during this period. After the polymerization is complete, the reactor contents are cooled to room temperature and then transferred to storage. Gel polymer viscosities vary widely, and are dependent upon the concentration and molecular weight of the active polymer component.

The polymerization reactions described herein are initiated by any means which results in generation of a suitable free-radical. Thermally derived radicals, in which the radical species results from thermal, homolytic dissociation of an azo, peroxide, hydroperoxide and perester compound are preferred. Especially preferred initiators are azo compounds including 2,2'-azobis(2 amidinopropane) dihydrochloride, 2,2'-azobis[2-(2-imidazolin-2-yl)propane] dihydrochloride, 2,2'-azobis(isobutyronitrile) (AIBN), 2,2'-azobis(2,4-dimethylvaleronitrile) (AIVN), and the like.

The polymerization conditions utilized herein are selected such that the resulting water-soluble structurally-modified polymer has a molecular weight of 2 million to 30 million and an intrinsic viscosity above 1, more preferably above 6 and still more preferably 15 to 30 dl/g. The reduced specific viscosity of the water-soluble structurally-modified polymer is generally above 3, preferably above 12 and frequently above 24 dl/g.

The structural modifiers are added to the reaction mixture after the start of polymerization of the monomers and prior to completion of polymerization of the monomers. They may be added all at once as a single treatment, or in portions. The level of modifier added to the aqueous polymer solution depends on the efficiency of the structural modifier, the polymer concentration, and the degree of polymerization at which it is added.

The degree of polymerization of monomers is determined by the change in the reaction density for water-in-oil emulsion polymerization, calorimeterically by measuring the heat of reaction, by quantitative infrared spectroscopy, or chromatographically, by measuring the level of unreacted monomer.

When a chain-transfer agent is the structural modifying agent, the chain-transfer agent may be added all at once as a single treatment, in portions, or in a manner such that the rate of addition parallels polymer conversion. In one embodiment, addition may be as a single treatment added after about 30%, preferably after about 50% polymerization of the monomers. The level of chain-transfer agent added is generally between from about 1 to about 30,000 ppm, preferably from about 25 to about 10,000 ppm and more preferably from about 50 to about 2,000 ppm based on monomer. When the chain-transfer agent is sodium hypophosphite, the level added is generally from about 2 to about 2000 ppm, preferably from about 100 to about 1000 ppm.

When the structural modifier is a cross-linking agent, the cross-linking agent is added after about 30%, preferably after about 50% polymerization of the monomers. The level of cross-linking agent is generally from about 0.1 to about 500 ppm, preferably from about 1 to about 50 ppm based on monomer. When the cross-linking agent is methylenebisacrylamide, the level is generally from about 0.5 to about 50 ppm, preferably from about 1 to about 10 ppm based on monomer.

When the cross-linker is a vinyltrialkoxysilane, the level of cross-linker is generally from about 0.1 to about 30,000 ppm, preferably from about 0.5 to about 15,000 ppm, more preferably from about 1 to about 3,000 ppm based on monomer. The vinyltrialkoxysilane may be added all at once as a single treatment, or in portions after the polymerization of the monomers has started, preferably after about 30 percent of the monomers have polymerized.

When the structural modifier is a combination of a cross-linker and a chain transfer agent, the amounts of each may vary widely based on the chain-transfer constant "efficiency" of the chain-transfer agent, the multiplicity and "efficiency" of the cross-linking agent, and the point during the polymerization where it is added. For example from about 1,000 to about 5,000 ppm (based on monomer) of a moderate chain transfer agent such as isopropyl alcohol may be suitable while much lower amounts, typically from about 100 to about 500 ppm, of more effective chain transfer agents such as mercaptoethanol are useful. Representative combinations of cross-linkers and chain transfer agents contain from about 1 to about 30,000 ppm, preferably from about 25 to about 10,000 and more preferably from about 300 to about 1500 ppm (based on monomer) of chain transfer agent and from about 1 to about 500, preferably from about 2 to about 100 and more preferably from about 5 to about 50 ppm (based on monomer) of cross-linker. A preferred combination of cross-linker and chain transfer agent is methylenebisacrylamide and formic acid and its salts, preferably sodium formate.

Where the structural modifier is a cross-linking agent, polymers formed by the addition of a cross-linking agent to the polymerization generally between 30% and 99% conversion, preferably between 50 and 90% conversion, and frequently between 65 and 85% conversion, are more active than the unmodified polymers which are substantially linear, cross-linked, water-insoluble particles disclosed in U.S. Pat. No. 4,950,725 and EP 202,780 and the highly branched, water-soluble polymers disclosed in U.S. Pat. No. 5,945,494.

The polymers modified with a cross-linking agent after the start of polymerization differ from the particulate polymer flocculants disclosed in U.S. Pat. No. 4,950,725 and EP 202,780 that are swellable, but, insoluble in water. These particles are formed either through the addition of a water-soluble cross-linking agent, or a mixture of different cross-linking reagents with different reactivities, usually polyethylenically unsaturated monomers at the front-end, or alternatively both at the beginning of the process and at or near the end of the process such that the availability of the cross-linker is substantially constant throughout the reaction or by cross-linking preformed watersoluble polymers. Polymers modified with a cross-linking agent as described herein are not particulate in aqueous solution.

The polymers of this invention also differ from polymers disclosed in U.S. Pat. No. 5,945,494, which are water-soluble, highly branched species. Essential to the formation of these polymers is the inclusion of a molecular weight modifying, or chain-transfer agent in combination with high levels of a branching agent (4 to 80 ppm, based on initial molar content) to form highly-branched, watersoluble polymers. As stated in U.S. Pat. No. 5,945,494 column 5, lines 35–38, in the absence of a chaintransfer agent, the incorporation of even extremely small amounts of branching agent, e.g. 5 parts per million may cause crosslinking, rendering the polymer insoluble in water. The combination of a branching agent and a molecular weight modifying agent included in the aqueous monomer solution at the start of reaction as disclosed in U.S. Pat. No. 5,945,494, will yield highly branched polymers with polymer chains of limited molecular weight.

It is believed that polymers modified with a cross-linking agent after the start of polymerization described herein contain a mixture of linear high molecular weight polymer formed during the initial part of the reaction, and long-chain branched polymer formed during the latter part of the reaction. For aqueous solutions made-up from polymers modified using late addition of a cross-linking agent, it is possible that water-soluble, non-particulate, aggregates of several entangled polymer chains exist. Macromolecular entanglements have been proposed for high molecular weight polymers, formed by free-radical polymerization methods (Gardner, et. al., J. Applied Polymer Science, 22 881–882, (1978); A. Wan, Polymer Preprints, Am. Chem. Soc., Division of Polymer Chemistry, 37(2), 655, (1996).

In a preferred aspect of this invention, the structurally-modified water-soluble polymer is selected from the group consisting of emulsion polymers, dispersion polymers and gel polymers.

In another preferred aspect, the monomers are selected from acrylamide or methacrylamide and one or more monomers selected from the group consisting of diallyldimethylammonium chloride, dimethylaminoethyl acrylate methyl chloride quaternary salt, acrylamidopropyltrimethylammonium chloride, dimethylaminoethyl methacrylate methyl chloride quaternary salt, methacrylamidopropyltrimethylammonium chloride, acrylic acid, sodium acrylate, ammonium acrylate, methacrylic acid, sodium methacrylate, and ammonium methacrylate.

In another preferred aspect, the structural modifier is selected from the group consisting of cross-linking agents, chain transfer agents and mixtures thereof.

In another preferred aspect, the chain transfer agents are selected from the group consisting of alcohols, sulfur compounds, carboxylic acids or salts thereof, phosphites, and combinations thereof.

In another preferred aspect, the chain transfer agents are selected from sodium formate and sodium hypophosphite.

In another preferred aspect, the cross-linking agent is selected from the group consisting of N,N-methylenebisacrylamide, N,N-methylenebismethacrylamide, triallylamine, triallyl ammonium salts, ethylene glycol dimethacrylate, diethylene glycol dimethacrylate, polyethylene glycol diacrylate, polyethylene glycol dimethacrylate, N-vinyl acrylamide, N-methyl allylacrylamide, vinyltrimethoxysilane, and combinations thereof.

In another preferred aspect, the cross-linking agent is vinyltrimethoxysilane.

In another preferred aspect, the cross-linking agent is methylenebisacrylamide.

In another preferred aspect, the monomers are acrylamide and dimethylaminoethylacrylate benzyl chloride quaternary salt and the structural modifier is vinyltrimethoxysilane.

In another preferred aspect, the monomers are acrylamide and diallyldimethylammonium chloride and the structural modifier is vinyltrimethoxysilane.

In another preferred aspect, the monomers are acrylamide and dimethylaminoethylacrylate methyl chloride quaternary salt and the structural modifier is methylenebisacrylamide.

In another preferred aspect, the monomers are acrylamide and dimethylaminoethylacrylate methyl chloride quaternary salt and the structural modifier is sodium formate.

In another preferred aspect, the monomers are acrylamide and dimethylaminoethylacrylate methyl chloride quaternary salt and the structural modifier is sodium hypophosphite.

In another preferred aspect, the monomers are acrylamide and dimethylaminoethylacrylate methyl chloride quaternary salt and the structural modifier is a combination of sodium formate and methylenebisacrylamide.

In another preferred aspect, the monomers are acrylamide, dimethylaminoethylacrylate benzyl chloride quaternary salt and dimethylaminoethylacrylate methyl chloride quaternary salt and the structural modifier is methylenebisacrylamide.

In another preferred aspect, the monomers are acrylamide, dimethylaminoethylacrylate benzyl chloride quaternary salt and dimethylaminoethylacrylate methyl chloride quaternary salt and the structural modifier is sodium formate.

In another preferred aspect, the monomers are acrylamide, dimethylaminoethylacrylate benzyl chloride quaternary salt and dimethylaminoethylacrylate methyl chloride quaternary salt and the structural modifier isa combination of methylenebisacrylamide and sodium formate.

In another preferred aspect, the monomers are acrylamide, dimethylaminoethylacrylate benzyl chloride quaternary salt and dimethylaminoethylacrylate methyl chloride quaternary salt and the structural modifier is vinyltrimethoxysilane.

In another preferred aspect, the monomers are acrylamide and acrylic acid or a salt thereof and the structural modifier is sodium hypophosphite.

In another aspect, this invention is directed to a method of preparing a structurally-modified water-soluble polymer comprising initiating polymerization of an aqueous solution of monomers under free radical polymerization conditions to form a polymer solution and adding at least one structural modifier to the polymer solution after at least 30% polymerization of the monomers has occurred.

In another aspect, this invention is directed to a method of flocculating an aqueous suspension of organic matter comprising adding to the suspension an effective flocculating amount of the structurally-modified water-soluble polymer prepared by initiating polymerization of an aqueous solution of monomers under free radical polymerization conditions to form a polymer solution and adding at least one structural modifier to the polymer solution after at least 30% polymerization of the monomers has occurred.

In another aspect, this invention is directed to a method of clarifying waste water comprising adding to the waste water an effective flocculating amount of a structurally-modified water-soluble polymer prepared by initiating polymerization of an aqueous solution of monomers under free radical polymerization conditions to form a polymer solution and adding at least one structural modifier to the polymer solution after at least 30% polymerization of the monomers has occurred.

The effective flocculating amount of the structurally-modified water-soluble polymer depends on the characteristics of the water being treated and can be readily determined by one of ordinary skill in the art. Polymer should be dosed at a sufficient level to cause flocculation of the dispersed material and cause improved settling. Typical dosages are from about 10 to 1,000 ppm, preferably from about 15 to about 400 ppm and more preferably from about 20 to about 200 ppm based on polymer actives.

In another aspect, this invention is directed to a method of increasing retention and drainage in a papermaking furnish comprising adding to the furnish an effective amount of a structurally-modified water-soluble polymer prepared by initiating polymerization of an aqueous solution of monomers under free radical polymerization conditions to form a polymer solution and adding at least one structural modifier to the polymer solution after at least 30% polymerization of the monomers has occurred.

The effective amount of the structurally-modified water-soluble polymer depends on the characteristics of the particular papermaking furnish and can be readily determined by one of ordinary skill in the papermaking art. Typical dosages are from about 0.01 to about 6, preferably from about 0.1 to about 4 and more preferably from about 0.1 to about 2 pounds polymer actives/ton solids in the furnish.

The structurally-modified water-soluble polymer of this invention may also be used in combination with a coagulant as part of a dual polymer treatment program. The retention and drainage properties of the furnish may also be improved by addition of a microparticle is described in U.S. Pat. Nos. 4,753,710 and 4,913,775 incorporated herein by reference.

"Microparticles" means highly charged materials that improve flocculation when used together with natural and synthetic macromolecules. Microparticles are used in combination with other wet end additives to improve retention and drainage on the paper machine. Microparticles encompass a broad set of chemistries including polysilicate microgel, structured colloidal silicas, colloidal alumina, polymers including copolymers of acrylic acid and acrylamide and and naphthalene sulfonate/formaldehyde condensate polymers, bentonite and mineral clays such as montmorillonite, saponite and smectite types and colloidal silica in its many forms including modified colloidal silicic acids such as those described in PCT/US98/19339.

Representative copolymers of acrylic acid and acrylamide usefil as microparticles include Nalco® 8677 PLUS, available from Nalco Chemical Company, Naperville, Ill., USA. Other copolymers of acrylic acid and acrylamide are described in U.S. Pat. No. 5,098,520, incorporated herein by reference.

"Bentonites" include any of the materials commercially referred to as bentonites or as bentonite-type clays, i.e., anionic swelling clays such as sepialite, attapulgite and montmorillonite. In addition, the bentonites described in U.S. Pat. No. 4,305,781 are suitable. A preferred bentonite is a hydrated suspension of powdered bentonite in water. Powdered bentonite is available as Nalbrite™, from Nalco Chemical Company.

Representative dispersed silicas have an average particle size of from about 1 to about 100 nanometers (nm), preferably from about 2 to about 25 nm, and more preferably from about 2 to about 15 nm. This dispersed silica, may be in the form of colloidal, silicic acid, silica sols, fumed silica, agglomerated silicic acid, silica gels, precipitated silicas, and all materials described in Patent Cooperation Treaty Patent Application No. PCT/US98/19339, so long as the particle size or ultimate particle size is within the above ranges. Dispersed colloidal silica in water with a typical particle size of 4 nm is available as Nalco® 8671, from Nalco Chemical Company. Another type of inorganic colloid used as a microparticle is a borosilicate in water; available as Nalco® 8692, from Nalco Chemical Company. Other types of colloidal silica and modified colloidal silicas are commercially available from E.I. DuPont de Nemours and Co., Wilmington, Del. under the tradename Ludox® from Akzo Nobel, Surte, Sweden (BMA or NP Series), from Vinings Industries Inc., Atlanta, Ga. and from Nissan Chemical Industries, Ltd., Tokyo, Japan.

Representative naphthalene sulfonate/formaldehyde condensate polymers include Nalco® 8678 from Nalco Chemical Company.

The amount of microparticle added is from about 0.05 to about 10, preferably from about 0.1 to about 9 and more preferably about 0.2 to about 6 pounds microparticle/ton.

"Pounds microparticle/ton" means pounds of actual microparticle per 2000 pounds of solids present in slurry. The abbreviation for pounds of actual microparticle per 2000 pounds of solids present in slurry is "lbs microparticle/ton".

The microparticle is added to the papermaking funish either before or after the structurally-modified polymer is added to the furnish. The choice of whether to add the microparticle before or after the polymer can be made by a person of ordinary skill in the art based on the requirements and specifications of the papermaking furnish.

Optionally, a coagulant is added to the furnish prior to the addition of the structurally-modified water-soluble polymer. Preferred coagulants are water-soluble cationic polymers such as epichlorohydrin-dimethylamine or polydiallyldimethylammonium chloride, alum, polyaluminum chlorides or cationic starch.

In another aspect, this invention is directed to a method of increasing retention and drainage in a papermaking furnish comprising adding to the furnish a microparticle and an effective amount of a structurally-modified water-soluble polymer prepared by initiating polymerization of an aqueous solution of monomers under free radical polymerization conditions to form a polymer solution and adding at least one structural modifier to the polymer solution after at least 30% polymerization of the monomers has occurred.

In another aspect, this invention is directed to a method of increasing retention and drainage in a papermaking furnish comprising adding to the furnish a microparticle, a coagulant and an effective amount of a structurally-modified water-soluble polymer prepared by initiating polymerization of an aqueous solution of monomers under free radical polymerization conditions to form a polymer solution and adding at least one structural modifier to the polymer solution after at least 30% polymerization of the monomers has occurred.

In another aspect, this invention is directed to a method of flocculating an aqueous coal refuse slurry comprising adding an effective amount of a structurally-modified water-soluble polymer prepared by initiating polymerization of an aqueous solution of monomers under free radical polymerization conditions to form a polymer solution and adding at least one structural modifier to the polymer solution after at least 30% polymerization of the monomers has occurred.

The foregoing may be better understood by reference to the following examples which are presented for purposes of illustration and are not intended to limit the scope of the invention. Examples 1–10 illustrate the embodiment of the invention which is late addition of cross linker; Examples 11–14, 25 and 26 illustrate the embodiment of the invention which is late addition of chain transfer agent; and Examples 15–23 illustrate the embodiment of the invention which is late addition of both cross-linker and chain transfer agent.

POLYMERS MODIFIED BY LATE ADDITION OF CROSS LINKING AGENTS

EXAMPLE 1

Polymer 1, a control polymer of 15% polymer solids, 90/10 mole percent AcAm/DMAEA.BCQ dispersion is synthesized in the following manner:

To a 1500 ml reaction flask fitted with a mechanical stirrer, thermocouple, condenser, nitrogen purge tube and addition port is added 213 g of a 49.6% aqueous solution of acrylamide (Nalco Chemical Company, Naperville, Ill.), 56.6 g of dimethylaminoethylacrylate benzyl chloride quaternary salt (70.9% aqueous solution, Nalco Chemical Company, Naperville, Ill.), 9 g of glycerin, 59 g of the copolymer of dimethylaminoethylacrylate benzyl chloride quaternary salt and diallyldimethylammonium chloride (15% aqueous solution, Nalco Chemical Company, Naperville, Ill.), 0.4 g of ethylenediaminetetraacetic acid, tetrasodium salt, 157 g of ammonium sulfate and 424 g of deionized water. The mixture is then heated to 48° C. while stirring at 900 rpm. After reaching 48° C., 1.2 g of a 1.0% aqueous solution of 2,2'-azobis(2-amidinopropane) dihydrochloride (V-50, Wako Chemicals, Dallas, Tex.) is added to the reaction mixture, the system is purged with nitrogen and the temperature is maintained at 48° C. Two hours after initiation, 3.8 g of a 1.0% aqueous solution of 2,2'-azobis (2-amidinopropane) dihydrochloride is added to the reaction and at three hours after initiation 6.0 g of dimethylaminoethylacrylate benzyl chloride quaternary salt and at four hours 4 g of a 10% aqueous solution of 2,2'-azobis(2-amidinopropane) dihydrochloride is added. At six hours the reaction is cooled to ambient temperature and 55.0 g of sodium sulfate, 10.0 g sodium thiosulfate, and 10.0 g acetic acid are added. The resulting product is a smooth milky white dispersion with a bulk viscosity of 30 cP (centipoise) and a reduced specific viscosity of 17.8 dl/g (0.045% polymer in 0.125 N $NaNO_3$ solution at 30° C.).

EXAMPLE 2

Polymer 2, a vinyltrimethoxysilane modified 15% polymer solids, 90/10 mole percent AcAm/DMAEA.BCQ dispersion polymer is synthesized using the general procedure described in Example 1. The standard method is modified by adding 0.25 g vinyltrimethoxysilane (Huls America, Inc., Bristol, Pa.) to the reaction mixture at 3.5 hours after initiation (approximately 88% conversion). No further modifications are made. The reduced specific viscosity of the product is 18.3 dl/g (0.045% polymer in 0.125 N $NaNO_3$ solution at 30° C.).

EXAMPLE 3

Polymer 3, a vinyltrimethoxysilane modified 15% polymer solids, 90/10 mole percent AcAm/DMAEA.BCQ dispersion is synthesized using the general procedure described in Example 1. The standard method is modified by addition of 0.10 g vinyltrimethoxysilane (Huls America, Inc. Bristol, Pa.) to the reaction mixture at 3 hours after initiation (approximately 86% conversion). No further modifications are made. The resulting product is a smooth milky white dispersion has a bulk viscosity of 30 cP and a reduced specific viscosity of 16 dl/g (0.045% polymer in 0.125 N $NaNO_3$ solution at 30° C.).

EXAMPLE 4

Polymer 4, a VTMS modified 15% solids, 90/10 mole percent AcAm/DMAEA.MCQ is synthesized using the following procedure.

To a 1500 ml resin flask equipped with a stirrer, temperature controller, nitrogen sparge tube and water condenser is added 335.2 g of deionized water, 230.3 g of a 48.6% aqueous solution of acrylamide (Nalco Chemical Co., Naperville, Ill.), 43.6 g of dimethlyaminoethylacrylate methyl chloride quaternary salt (DMAEA.MCQ, 80%, NCF Manufacturing, Riceboro, Ga.), 50.0 g of a 15% solution of poly(dimethlaminoethylmethacrylate methyl chloride quaternary salt, Nalco Chemical Co., Naperville, Ill.), 5.0 g of adipic acid, 13.5 g of glycerol, 0.42 g of EDTA.4 $Na^+$and 302.0 g ammonium sulfate. The mixture is heated to 48° C. and 1.0 g of a 1% solution of V-50 is added. The resulting solution is sparged with nitrogen at the rate of 1000 ml/min. After 15 minutes, polymerization begins and the solution becomes viscous. Over the next four hours, the temperature is maintained at 48° C. After 3.0 hours of polymerization, an additional 2.0 g of a 1% solution of V-50 is added to the reaction mixture. After 3.5 hours of polymerization (approximately 80% conversion), 0.25 g of vinyltrimethoxysilane is added to the reaction mixture. At four hours after initiation, 4.0 g of a 10% solution of V-50 is added to the dispersion and the reaction is allowed to continue for another 4 hours. After this time, the dispersion is cooled to room temperature, and 5.0 g of adipic acid and 10.0 g of sodium thiosulfate is added. The polymer product has a Brookfield viscosity of 150 cP (#3 spindle, 12 rpm) and a reduced specific viscosity of 18 dl/g at 450 ppm in 1 N $NaNO_3$.

EXAMPLE 5

Polymer 5, a 21% polymer solids, 70/30 mole percent acrylamide/diallyldimethyl ammonium chloride VTMS-modified dispersion polymer was synthesized in the following manner.

To a 1500 ml reaction flask fitted with a mechanical stirrer, thermocouple, condenser, nitrogen purge tube, and addition port is added 28.0 g of a 49.4% aqueous solution of acrylamide (Nalco Chemical Company, Naperville, Ill.), 175.0 g of a 63% aqueous solution of diallyldimethyl ammonium chloride (Nalco Chemical Company, Naperville, Ill.), 44.0 g of a 15% aqueous solution of a homopolymer of dimethylaminoethyl acrylate methyl chloride quaternary salt (Nalco Chemical Company, Naperville, Ill.), 0.66 g of sodium formate, 0.44 g of ethylenediaminetetraacetic acid, tetra sodium salt, 220.0 g of ammonium sulfate, 44.0 g sodium sulfate, 0.20 g polysilane antifoam (Nalco Chemical Company, Naperville, Ill.), and 332.0 g of deionized water. The resulting mixture is heated to 42° C. and is stirred at 700 rpm. Upon reaching 42° C., 5.0 g of a 10.0% aqueous solution of 2,2'-azobis[2-(2- imidazolin-2-yl)propane] dihydrochloride (VA-044, Wako Chemicals, Dallas, Tex.) is added to the reaction mixture and a nitrogen purge started. Forty-five minutes after initiator addition, 194.7 g of a 49.4% aqueous solution of acrylamide is added to the reaction mixture over a period of 6 hours. At 4.5 hours after initiator addition (~80% acrylarnide conversion based on total monomer), 0.26 g of vinyltrimethoxysilane (Huls America, Inc., Bristol, Pa.) is added to the reaction. At 8 hours after the initiator addition, the reaction mixture is cooled to ambient temperature. The product is a smooth milky white dispersion with a bulk viscosity of 520 cP and a reduced specific viscosity of 4.5 dl/g (0.045% solution of the polymer in 1.0 N aqueous sodium nitrate at 30° C.).

EXAMPLE 6

Polymer 6, a vinyltrimethoxy silane-modified, 21% polymer solids, 70/30 mole percent acrylamide/diallyldimethyl ammonium chloride dispersion polymer is synthesized following the procedure described in Example 5, except that the vinyltrimethoxysilane is added to the reaction 5.5 hours after initiator addition (~90% acrylamide conversion based on total monomer). The product is a smooth milky white dispersion with a bulk viscosity of 460 cp and a reduced specific viscosity of 5.1 dl/g (0.045% solution of the polymer in 1.0 N aqueous sodium nitrate at 30° C.).

The polymers synthesized by the methods of Example 1–6 are summarized in Table 1.

TABLE 1

Polymer Modified by Late Addition of VTMS
(VTMS levels in ppm based on polymer actives in product)

| Polymer | Modified | Form | [VTMS] (ppm) | RSV (dL/g) |
|---|---|---|---|---|
| 1 | no | hydrophobic dispersion | None | 18 |
| 2 | yes | hydrophobic dispersion | 1667 | 18 |
| 3 | yes | hydrophobic dispersion | 667 | 16 |
| 4 | yes | hydrophilic dispersion | 1667 | 18 |
| 5 | yes | hydrophilic dispersion | 1250 | 4.5 |
| 6 | yes | hydrophilic dispersion | 1250 | 5.1 |
| 7[1] | no | hydrophilic dispersion | None | 18 |
| 8[2] | no | hydrophilic dispersion | None | 4.5 |

[1]Commercially available 90/10 mole percent AcAm/DMAEA.MCQ copolymer (Nalco Chemical Company, Naperville, IL).
[2]Commercially available 70/30 mole percent AcAm/DADMAC copolymer (Nalco Chemical Company, Naperville, IL).

EXAMPLE 7

Three experimental techniques are utilized to assess the utility of the structurally-modified polymers in papermaking applications. These techniques are detailed below. For the first two techniques, a synthetic alkaline paper furnish is utilized.

The alkaline furnish has a pH of 8.1 and is composed of 80 weight percent cellulosic fiber and 20 weight percent filler diluted to an overall consistency of 0.5% by weight using synthetic formulation water. The cellulosic fiber consists of 60% by weight bleached hardwood kraft and 40% by weight bleached softwood kraft. The filler is a commercial ground calcium carbonate provided in dry form. The formulation water contains 200 ppm calcium hardness (added as $CaCl_2$), 152 ppm magnesium hardness (added as $MgSO_4$), and 110 ppm bicarbonate alkalinity (added as $NaHCO_3$).

Britt Jar Test

The Britt Jar Test uses a Britt CF Dynamic Drainage Jar developed by K. W. Britt of New York University, which generally consists of an upper chamber of about 1 liter capacity and a bottom drainage chamber, the chambers being separated by a support screen and a drainage screen (typically 200 mesh or 76 μm opening). Below the drainage chamber is a flexible tube extending downward equipped with a clamp for closure. The upper chamber is provided with a 2-inch, 3-blade propeller to create controlled shear conditions in the upper chamber. The test is performed according to the following sequence:

| Time (seconds) | Action |
|---|---|
| 0 | Commence shear via mixing; add synthetic furnish. |
| 10 | Add starch (usually 10 lb/t). |
| 20 | Add flocculant to be tested. |
| 30 | Open the tube clamp to commence drainage. |
| 60 | Stop draining and measure turbidity of filtrate. |

Where the beneficial effect of microparticles on polymer performance is evaluated, the following sequence is used:

| Time (seconds) | Agitator Speed (rpm) | Action |
|---|---|---|
| 0 | 750 | Commence shear via mixing; add synthetic furnish. |
| 10 | 750 | Add cationic starch (usually 10 lb/t). |
| 20 | 2000 | Add flocculant to be tested. |

-continued

| Time (seconds) | Agitator Speed (rpm) | Action |
|---|---|---|
| 50 | 750 | Reduce the shear via mixing speed. |
| 60 | 750 | Add microparticle. |
| 70 | 750 | Open the tube clamp to commence drainage. |
| 100 | 750 | Stop draining. |

The starch used is Solvitose N, a cationic potato starch, commercially available from Nalco Chemical Company, Naperville, Ill. The material drained from the Britt Jar (the "filtrate") is collected and diluted with water to provide a turbidity which can be measured conveniently. The turbidity of such diluted filtrate is then determined in Nephelometric or Formazine Turbidity Units (NTU or FTU). The turbidity of the filtrate is inversely proportional to the papermaking retention performance; the lower the turbidity value (or higher the turbidity reduction), the higher is the retention of filler and/or fines. Therefore the lower the turbidity, the more efficient the flocculant. The turbidity values are determined using a Hach Turbidimeter.

Filler retention for the synthetic alkaline furnish is also determined by gravimetric analysis (500–550° C.) of the filtrate collected.

Focused Beam Reflectance Measurement (FBRM)

The size of flocs formed (evaluated by determining changes in the mean chord length) for the synthetic alkaline furnish are measured in-situ using a Focused Beam Reflectance (FBRM) instrument to measure peak mean chord length. The FBRM employed in the following examples is described in U.S. Pat. No. 4,871,251 and Alfano, et al., Nordic Pulp and Paper Research Journal, 13, (2), 159 (1998), and generally consists of a laser source, optics to deliver the incident light to and retrieve the scattered light from the furnish, a photodiode, and signal analysis hardware. Commercial instruments (Model # M100 or M500) are available from Lasentec™, Redmond, Wash.

The experiment consists of taking 300 ml of the desired paper furnish and placing this in the appropriate mixing beaker. Shear is provided to the furnish via a variable speed motor and propeller. The propeller is set at a fixed distance from the probe window to ensure slurry movement across the window. The change in mean chord length of the the furnish relates to papermaking retention performance; the greater the change induced by the treatment, the higher the retention value. Therefore a larger mean chord length number means that the flocculant is more efficient. A typical dosing sequence is shown below.

| Time (seconds) | Action |
|---|---|
| 0 | Commence mixing. Record baseline floc size |
| 30 | Add cationic starch. Record floc size change. |
| 45 | Add flocculant to be tested. Record floc size change. |
| 90 | Terminate experiment. |

Dissolved Air Flotation Test (DAF)

Samples of dissolved air flotation (DAF) influent are obtained from a Southern United States newsprint deinking mill. Typical jar tests are used to monitor polymer performance. Samples of the deinking influent are stirred at 200 rpm (fast mix) for 3 minutes. A coagulant (alum) is added at the beginning of fast mix and the flocculant during the last 40 seconds of the fast mix. This is followed by a slow mix at 25 rpm for 2 minutes. The samples are allowed to settle for 5 minutes and an aliquot of the upper liquid layer is removed. The turbidity of these aliquots is determined with a HACH DR2000 at 450 nm. The lower the turbidity, the more efficient the flocculant.

The Britt Jar test described above is utilized to obtain the results of Tables 2–4. In all examples, a greater turbidity reduction resulted from use of VTMS-modified dispersion polymer flocculants than with the equivalent dispersion polymer flocculants which are not modified.

TABLE 2

Polymer Retention Performance Comparison for Modified versus Unmodified Dispersion Polymers at 750 rpm (low shear)

| | Performance[2] | |
|---|---|---|
| Dosage[1] | Polymer 7 | Polymer 4 |
| 0.3 | 69.2 | 71.5 |
| 0.6 | 78.3 | 83.2 |
| 0.9 | 82.6 | 86.9 |

[1]pound active per ton solids.
[2]measured in terms of percent turbidity reduction.

TABLE 3

Polymer Retention Performance for Modified versus Unmodified Dispersion Polymers at 1250 rpm (medium shear)

| | Performance[2] | | | |
|---|---|---|---|---|
| Dosage[1] | Polymer 1 | Polymer 2 | Polymer 7 | Polymer 4 |
| 0.60 | 57.1 | 59.4 | 57.1 | 59.4 |
| 0.90 | 62.9 | 64.7 | 59.7 | 62.5 |
| 1.20 | 63.7 | 72.1 | 62.3 | 69.5 |

[1]pound active per ton solids.
[2]measured in terms of percent turbidity reduction.

TABLE 4

Polymer Retention Performance for Modified versus Unmodified Dispersion Polymers at 1500 rpm (high shear)

| | Performance[2] | | | | |
|---|---|---|---|---|---|
| Dosage[1] | Polymer 1 | Polymer 2 | Polymer 3 | Polymer 7 | Polymer 4 |
| 0.60 | — | — | — | 50.4 | 53.3 |
| 0.90 | 52.6 | 60.6 | — | — | — |
| 1.20 | 54.2 | — | 55.3 | 55.6 | 63.4 |
| 1.80 | — | — | 67.5 | 55.6 | 64.3 |
| 2.10 | 65.1 | 67.8 | 71.1 | — | — |

[1]Pound active per ton solids.
[2]Measured in terms of percent turbidity reduction.

The Dissolved Air Flotation test (DAF) is utilized to obtain the results of Table 5. In the tests, the VTMS modified dispersion polymer flocculant provided greater turbidity reduction than the equivalent unmodified polymer flocculent.

TABLE 5

Clarification of DAF Influent using Modified and
Unmodified Polymers (performance in terms of
percent turbidity reduction for a polymer dose of 1.6 ppm)

| Polymer 8 | Polymer 5 | Polymer 6 |
|---|---|---|
| 69.23 | 70.9 | 71.4 |

TABLE 6

Clarification of DAF Influent using
Unmodified and Modified polymers

| Polymer Dose[1] (ppm) | Performance[2] | | |
|---|---|---|---|
| | Polymer 8 | Polymer 5 | Polymer 6 |
| 0.8 | 67.89 | 69.23 | 68.56 |
| 1.6 | 76.59 | 78.93 | 77.26 |

[1]In the presence of 150 ppm alum.
[2]Measured in terms of percent turbidity reduction.

The foregoing results demonstrates that a modified polymer shows improved performance over that of an unmodified polymer having comparable solution properties.

EXAMPLE 8

AcAm/DMAEA.MCQ (9:1) inverse emulsion polymers modified with MBA at different conversions are synthesized in the following manner:

An aqueous monomer phase is made-up by stirring together 364.37 g of a 49.6% aqueous solution of acrylamide (AcAm, Nalco Chemical Co., Naperville, Ill.), 178.33 g of water, 9.00 g of adipic acid, 27.00 g of NaCl, and 0.80 g of a 50% aqueous solution of NaOH. The components are stirred until dissolved. To the resulting solution is added 67.90 g of a 80.3% solution of dimethylaminoethylacrylate methyl chloride quaternary salt (DMAEA.MCQ, CPS Chemical Co.; Old Bridge, N.J.) and 0.09 g of EDTA.4 Na$^+$ (ethylenediamine tetraacetic acid, tetra sodium salt, Van Waters & Rogers, Geismar, La.). The pH of the resulting mixture is 3.9.

An oil phase is prepared by heating a mixture of 234.29 g of paraffinic oil (Isopar M, Exxon, Houston, Tex.), 13.50 g of Span-80 and 4.50 g of Tween-61 until the surfactants dissolve (54–57° C.). The oil phase is charged into a 2 L reactor and heated to 45° C. With vigorous stirring (900 rpm, 10 mm rod with a teflon paddle at the base and 6-blade turbine mounted 3-inches from the bottom), the monomer phase is added over 2 minutes. The resulting mixture is stirred for 30 minutes.

To the water-in-oil emulsion is added 0.200 g of AIBN and 0.027 g of AIVN. The polymerization is carried out under a N$_2$ atmosphere at 45° C. for 4 hours, then 70° C. for one hour. The percent conversion is estimated by density change. A density of 0.9855 g/ml is measured for the starting emulsion, and a density of 1.0217 g/ml for the final emulsion. At different densities of the emulsion (related to percent monomer conversion), 4.72 g of a 200 ppm solution of methylene bisacrylamide (4 ppm based on monomer, MBA, Aldrich Chemical Company, Milwaukee, Wis.) is added to the reaction mixture. Polymers prepared using the foregoing procedure are shown in Table 7. Polymer 14 is representative of those polymers disclosed in EP 202,780. For these emulsion polymers synthesized at 26 percent actives, the highest reduced specific viscosity is obtained for polymers where MBA is added at 75–85% conversion.

TABLE 7

Representative 90/10 mole % AcAm/DMAEA.MCQ
Copolymers Modified Using MBA, Prepared
According to the Method of Example 8

| Polymer | [MBA], ppm | Added at % Conversion | RSV, (dl/g) |
|---|---|---|---|
| 9 | 0 | NA | 27.0 ± 2.8 |
| 10 | 4 | 75–85 | 31.9 ± 1.4 |
| 11 | 4 | 65 | 26.3 |
| 12 | 4 | 46 | 22.0 |
| 13 | 4 | 17 | 16.0 |
| 14[1] | 4 | 0 | 13.0 |

[1]Polymer synthesized as described in EP 202,780.

TABLE 8

Reduced Specific Viscosity of Modified Polymers
(90/10 mole % AcAm/DMAEA · MCQ)

| Polymer | MBA Concentration (ppm) | Added At % Conversion | RSV, (dl/g) |
|---|---|---|---|
| 9 | 0 | NA | 26.8 |
| 10 | 4 | 82 | 31.0 |
| 14[1] | 4 | 0 | 13.0 |
| 15[1] | 2 | 0 | 19.3 |
| 16[1] | 6 | 0 | 9.4 |

[1]Polymer synthesized as described in EP 202,780.

Table 8 illustrates that when the cross-linking agent is present at the beginning of polymerization, the resulting polymers show a drop in reduced specific viscosity even at very low MBA concentrations. In contrast to the polymers disclosed in EP 202,780, the polymers modified as described herein have a greater viscosity, which is advantageous for a flocculant.

EXAMPLE 9

Polymers modified with MBA according to the procedure described in Example 8 are compared to polymers conventionally cross-linked. It is known to those skilled in the art that conventionally, the cross-linker is added at the beginning of the polymerization. We have discovered that when the cross-linker is added is of critical importance to the flocculating ability of the resultant polymer. Tables 8–15 illustrate the surprising superiority of polymer 10, modified by late addition of cross-linker over polymer 14 that is conventionally cross-linked and polymer 9 that is unmodified. Tables 9, 10, 12, 13, 15 and 16 contain results of Britt Jar tests, and Tables 11 and 14 contain results of FBRM tests.

TABLE 9

Retention Performance for Modified and Unmodified Polymers

| Dose[1] | Performance[2] | | |
|---|---|---|---|
| | Polymer 9 | Polymer 10 | Polymer 14 |
| 0.14 | 58.6% | 59.8% | NA |
| 0.28 | 69.1% | 78.1% | 71.9% |
| 0.56 | 84.3% | 87.2% | 82.9% |

[1]Pounds active per ton of slurry solids
[2]Percent turbidity reduction indicative of total retention; synthetic alkaline furnish.

TABLE 10

Retention Performance for Modified and Unmodified Polymers

| | Performance[2] | |
|---|---|---|
| Dose[1] | Polymer 9 | Polymer 10 |
| 0.25 | 55.9% | 68.8% |
| 1.00 | 87.5% | 95.1% |
| 2.00 | 87.6% | 99.9% |

[1]Pounds active per ton of slurry solids.
[2]Percent increase in filler retention; synthetic alkaline furnish.

TABLE 11

Flocculation Performance of Modified and Unmodified Polymers Determined using FBRM

| | Performance[2] | |
|---|---|---|
| Dose[1] | Polymer 9 | Polymer 10 |
| 0.25 | 36.0 | 32.1 |
| 0.50 | 44.1 | 35.5 |
| 1.00 | 45.2 | 46.0 |
| 2.00 | 46.2 | 57.2 |

[1]Pounds active per ton of slurry solids.
[2]Change in peak mean chord length; synthetic alkaline furnish.

TABLE 12

Retention Performance for Modified and Unmodified Polymers

| | % Turbidity Reduction[1] | |
|---|---|---|
| Polymer | 0.5 lb/t | 1.0 lb/t |
| 14 | 51.9 | 66.3 |
| 13 | 54.3 | 71.4 |
| 12 | 56 | 70.8 |
| 11 | 66 | 79.2 |
| 10 | 62 | 78.7 |
| 9 | 60.3 | 78 |

[1]Furnish from a southern paper mill.

TABLE 13

Retention Performance for Modified and Unmodified Polymers

| | Performance[2] | |
|---|---|---|
| Dose[1] | Polymer 9 | Polymer 10 |
| 1.0 | 18.9% | 20.4% |
| 2.0 | 36.5% | 40.2% |
| 4.0 | 55.0% | 64.1% |

[1]Pounds active per ton of slurry solids.
[2]Percent turbidity reduction; at a midwestern paper mill.

TABLE 14

Flocculation Performance of Modified and Unmodified Polymers Determined using FBRM (Model M100)

| | Performance[2] | |
|---|---|---|
| Dose[1] | Polymer 9 | Polymer 10 |
| 0.25 | 48.5 | 58.7 |
| 0.50 | 60.0 | 69.5 |
| 1.00 | 73.5 | 94.4 |

[1]Pounds active per ton of slurry solids.
[2]Change in peak mean chord length; furnish from a midwestern paper mill.

The data in the above tables clearly show that the structurally-modified polymers are more efficient and effective retention aids than the linear controls for synthetic alkaline furnish and mill furnishes.

EXAMPLE 10

The following two Britt Jar test experiments demonstrate that the polymers of this invention modified by late addition of cross-linkers have better retention performance than conventional treatments when used together with bentonite in a microparticle program on a synthetic alkaline furnish. The results are detailed in Tables 15 and 16.

TABLE 15

Performance of Modified and Unmodified Polymers in Conjunction with Microparticles

| Polymer[1] | Bentonite dose (pounds active per ton of slurry solids) | Retention, % |
|---|---|---|
| 9 | 1.0 | 81.5 |
| 10 | 1.0 | 87.5 |
| 17[2] | 1.0 | 78.1 |

[1]Treated at 1.5 pounds active per ton of slurry solids; synthetic alkaline furnish.
[2]Cationic flocculant FO 4198, available from SNF, St. Etienne, France. (cationic, branched dry polymer described in US 5,393,381).

Table 16 shows the results for a polymer/microparticle combination, where the microparticle is either bentonite or borosilicate, available from Nalco Chemical Co. of Naperville, Ill. under the tradename UltraXol®. For the sake of clarity, modified polymers of this invention are offset to the right in the first column, for comparison to conventional treatments which are offset to the left.

TABLE 16

Performance of Modified and Unmodified Polymers in conjunction with Microparticles

| Polymer/Dose[1] | Microparticle/Dose[1] | Retention, % |
|---|---|---|
| 9/0.5 | bentonite/3.0 | 72.8 |
| 9/1.0 | bentonite/1.0 | 77.1 |
| 9/1.0 | bentonite/3.0 | 86.4 |
| 10/0.5 | bentonite/3.0 | 79.8 |
| 10/1.0 | bentonite/1.0 | 88.0 |
| 10/1.0 | bentonite/3.0 | 95.1 |
| 14/0.5 | bentonite/3.0 | 63.3 |
| 14/1.0 | bentonite/3.0 | 80.4 |
| 10/0.5 | borosilicate/1.0 | 79.5 |
| 10/1.0 | borosilicate/1.0 | 93.9 |

[1]Pounds active per ton of slurry solids; synthetic alkaline furnish.

Table 16 demonstrates that the modified polymers of this invention (Polymer 10) performs better than the commercially available flocculant (Polymer 9) in a microparticle program of bentonite or borosilicate. Polymers synthesized with cross-linking agent added upfront (Polymer 14) also show inferior performance to the modified polymer of this invention.

CHAIN TRANSFER AGENT MODIFIED POLYMERS

EXAMPLE 11

An AcAm/DMAEA.MCQ (90:10) copolymer lattice modified by late addition of sodium formate at high conversion (Polymer 18), is synthesized in the following manner.

An aqueous monomer phase is made-up by stirring together 484.12 g of a 49.4% aqueous solution of acrylamide (Nalco Chemical Co., Naperville, Ill.), 20.25 g of water, 9.00 g of adipic acid, 27.00 g of NaCl, and 0.27 g of a 50% aqueous solution of NaOH. The components are stirred until dissolved. To the resulting solution is added 90.30 g of a 80.2% solution of dimethylaminoethylacrylate methyl chloride quaternary salt (DMAEA.MCQ, CPS Chemical Co.; Old Bridge, N.J.) and 0.18 g of EDTA.4 Na$^+$ (Van Waters & Rogers, Geismar, La.). The pH of the resulting mixture is 3.8.

An oil phase is prepared by heating a mixture of 243.00 g of paraffinic oil (Isopar M, Exxon, Houston, Tex.), 8.92 g of Span-80 and 13.58 g of Tween-61 until the surfactants dissolve (54–57° C.). The oil phase is charged into a 2 L reactor and heated to 45° C. With vigorous stirring (900 rpm, 10 mm rod with a teflon paddle at the base and 6-blade turbine mounted 3-inches from the bottom), the monomer phase is added over 2 minutes. The resulting mixture is stirred for 30 minutes.

To the water-in-oil dispersion is added 0.200 g of AIBN and 0.027 g of AIVN. The polymerization is carried out under a $N_2$ atmosphere at 45° C. for 4 hours, then 70° C. for one hour. At a conversion of 80% (estimated by density change), 8.29 g of a 38% solution of sodium formate (2000 ppm based on monomer, Van Waters & Rogers, Geismar, La.) is added to the reaction mixture. The resulting polymer has an RSV of 30.9 dl/g (1M $NaNO_3$, 450 ppm, 30° C.). An unmodified polymer polymerized without late addition of sodium formate (Polymer 19, Table 17) is synthesized in a similar manner. These polymers are characterized in Table 17.

TABLE 17

Representative Cationic AcAm/DMAEA-MCQ Copolymers Modified Using Sodium Formate (prepared according to the method of Example 11)

| Polymer | Mole % DMAEA-MCQ | Sodium fomate ppm | Added at (% Conversion) | RSV (dl/g) |
|---|---|---|---|---|
| 18 | 10 | 2000 | 82 | 30.9 |
| 19 | 10 | 0 | — | 17.8 |

To those skilled in the art, formic acid or metal salts thereof, are known as efficient chain transfer agents to limit the molecular weight and viscosity of acrylamide based polymers (for example, U.S. Pat. No. 4,307,215). It has also been reported (U.S. Pat. No. 4,307,215 at col., line 54) that addition of chain transfer agent after polymerization has no effect on molecular weight. However, as shown in Tables 17, 19 and 22, we have found that adding chain transfer agents at different polymerization stages gives polymers with increased reduced specific viscosity over unmodified analogs. Tables 18 and 20 illustrate that the modified polymers are superior to the unmodified control polymers in paper retention tests.

TABLE 18

Retention Performance for Modified and Unmodified Polymers

| | Performance[2] | |
|---|---|---|
| Dose[1] | Polymer 19 | Polymer 18 |
| 0.25 | 61.4% | 71.6% |
| 0.50 | 72.2% | 86.6% |
| 1.00 | 85.2% | 93.5% |

[1]Pounds active per ton of slurry solids.
[2]Percent turbidity reduction; synthetic alkaline furnish.

EXAMPLE 12

An AcAm/DMAEA.MCQ (90:10) copolymer lattice modified by late addition of sodium hypophosphite at high conversion (Polymer 20), is synthesized in the following manner.

An aqueous monomer phase is made-up by stirring together 281.96 g of acrylamide (Mitsubishi, Japan), 194.00 g of water, 9.00 g of adipic acid, 27.00 g of NaCl, and 0.27 g of a 50% aqueous solution of NaOH. The resulting mixture is stirred for 10 minutes. To the resulting suspension is added 107.54 g of a 79.4% solution of dimethylaminoethylacrylate methyl chloride quaternary salt (DMAEA.MCQ, CPS Chemical Co.; Old Bridge, N.J.) and 0.18 g of EDTA.4 Na$^+$ (Van Waters & Rogers, Geismar, La.). A solution is obtained by heating the suspension to 35° C. while stirring for about 10 minutes. The pH of the resulting mixture is 3.8.

An oil phase is prepared by heating a mixture of 252.00 g of paraffmic oil (Isopar M, Exxon, Houston, Tex.), 15.79 g of Span-80 and 11.21 g of Tween-61 until the surfactants dissolve (54–57° C.). The oil phase is charged into a 2 L reactor and heated to 42° C. With vigorous stirring (900 rpm, 10 mm rod with a teflon paddle at the base and 6-blade turbine mounted 3-inches from the bottom), the monomer phase is added over 2 minutes. The resulting mixture is stirred for 30 minutes.

To the water-in-oil emulsion is added 0.200 g of AIBN and 0.027 g of AIVN. The polymerization is carried out under a $N_2$ atmosphere at 42° C. for 2 hours. The reaction mixture is then cooled to 35° C., 0.85 g of a 10% aqueous solution of 2,2'-azobis[2-(2-imidazolin-2-yl)] dihydrochloride (VA-044, Wako Chemical Co.) is added, and the reaction continued for 19 hours. At a conversion of 75% (estimated by density change, 100 minutes), 1.84 g of a 20% solution of sodium hypophosphite monohydrate (1000 ppm based on monomer, J. T. Baker, Phillipsburg, N.J.) is added to the reaction mixture. The resulting polymer has an RSV of 27.7 dl/g (1M $NaNO_3$, 450 ppm, 30° C.).

An unmodified polymer polymerized without late addition of sodium hypophosphite (Polymer 21) is synthesized in a similar manner, except, VA-044 is omitted from the formulation and polymerization is performed using a 42–50° C. temperature gradient over 2.5 hours, then at 70° C. for 1 hour. Polymer 21 has an RSV of 13.6 dl/g (1M $NaNO_3$, 450 ppm, 30° C.).

TABLE 19

Representative Cationic AcAm/DMAEA.MCQ Latex Copolymers
Modified Using Sodium Hypophosphite
(prepared according to the method of Example #12)

| | | Modification | | | |
|---|---|---|---|---|---|
| Polymer | Mole % DMAEA.MCQ | Chain Transfer Agent | Level (ppm) | Added at % conversion | RSV (dl/g) |
| 20 | 10 | Sodium hypophosphite | 1,000 | 75 | 27.7 |
| 21 | 10 | — | — | — | 13.6 |

TABLE 20

FBRM Measurement of Polymers 9, 20 and 21 using the
Dosing Sequence in Table 21
(Lasentec M500)

| | Performance[2] | | |
|---|---|---|---|
| Dose[1] | Polymer 9 | Polymer 21 | Polymer 20 |
| 0.25 | 4.2 (±0.3) | 1.6 (±1.2) | 5.8 (±1.8) |
| 0.50 | 7.7 (±0.7) | 3.8 (±0.9) | 10.0 (±1.3) |
| 1.00 | 13.3 (±1.4) | 7.8 (±2.0) | 15.8 (±2.0) |

[1]Pounds active per ton of slurry solids.
[2]Change in peak mean chord length; synthetic alkaline furnish

TABLE 21

Dosing Sequence for Table 20

| Time (seconds) | Action |
|---|---|
| 0 | Commence mixing. Record baseline floc size. |
| 20 | Add flocculant to be tested. Record floc size change. |
| 60 | Terminate experiment. |

EXAMPLE 13

An AcAm/sodium acrylate (70:30) copolymer lattice modified by late addition of sodium hypophoshite at high conversion (Polymer 22), is synthesized in the following manner.

An aqueous monomer phase is made-up as follows. A 50% aqueous solution of NaOH (92.0 g) is addes dropwise to a cold solution of acrylamide (376.8 g of a 50.8% aqueous solution), 166.5 g of water, and 83.0 g of glacial acrylic acid until a solution pH of 8.3 is obtained. A 2% solution of EDTA.4Na+ Waters & Rogers, Geismar, La.) is added to the resulting mixture.

An oil phase is prepared by heating a mixture of 252.8 g of paraffinic oil (Escaid-110), 12.2 g of Span-80 and 7.3 g of Tween-61 until the surfactants dissolved (54–57° C.). The oil phase is charged into a 2 L reactor and heated to 45° C. With vigorous stirring (900 rpm, 10 mm rod with a teflon paddle at the base and 6-blade turbine mounted 3-inches from the bottom), the monomer phase is added over 2 minutes. The resulting mixture is stirred for 30 minutes.

To the water-in-oil emulsion is added 0.51 g of AIBN. The polymerization is carried out under a $N_2$ atmosphere at 45° C. for 4 hours, then at 70° C. for 1 hour. At a conversion of 70 (estimated by density change, 90 minutes), 4.0 g of a 0.5% solution of sodium hypophosphite monohydrate (67 ppm based on monomer, J. T. Baker, Phillipsburg, N.J.) is added to the reaction mixture. The resulting polymer has an RSV of 50.7 dl/g (1M $NaNO_3$, 450 ppm, 30° C.).

An unmodified polymer polymerized without late addition of sodium hypophosphite (Polymer 23) is synthesized in a similar manner.

TABLE 22

Representative Anionic AcAm/Sodium Acrylate Latex Copolymers
Modified Using Chain-Transfer Agents
(prepared according to the method of Example 13)

| | | Modification | | | |
|---|---|---|---|---|---|
| Polymer | Mole % Sodium acrylate | Chain transfer agent | Level (ppm) | Added at % conversion | RSV (dl/g) |
| 22 | 30 | Sodium hypophosphite | 67 | 70 | 50.7 |
| 23 | 30 | — | — | — | 20.0 |

EXAMPLE 14

An aqueous dispersion of acrylamide/acrylic acid copolymer (70/30 mole %), that contains sodium formate (CTA) in the initial monomer phase and is modified by late addition of sodium hypophosphite at high conversion (Polymer 24), is synthesized in the following manner.

A monomer reaction solution is prepared by combining 334.6 g deionized water, 65.0 g sodium sulfate, 85.0 g ammonium sulfate, 1.4 g sodium formate, 326.3 g of a 48.9% aqueous solution of acrylamide, 0.40 g of the tetrasodium salt of ethylene diamine tetracetic acid, 69.3 g acrylic acid, 13.5 g of a 50% aqueous solution of sodium hydroxide, and 100.0 g of a 12% aqueous solution of poly(acrylamidomethylpropanesulfonic acid/methacrylic acid) copolymer (Nalco Chemical Company, Naperville, Ill.). The pH of the resulting mixture is 4.0. The monomer reaction solution is heated to 35° C. with thorough mixing. To the homogenous monomer reaction solution is added 1.0 g of a 1% aqueous solution of VA-044 (2,2'-Azobis (N,N'dimethyleneisobutyramidine)dihydrochloride), Wako Chemicals USA, Inc.; Richmond, Va.). The polymerization is carried out under $N_2$ atmosphere at 35° C. with thorough mixing. After a total reaction time of 4 hours, 1.0 g of a 1% aqueous solution of VA-044 is added to the reaction mixture. At a monomer conversion of 80%, 0.57 g of a 10% aqueous solution of sodium hypophosphite monohydrate (250 ppm based on monomer) is added to the reaction mixture. After a total reaction time of 8 hours, 2.0 g of a 10% aqueous solution of VA-044 is added, and the reaction continued for another 4 hours (for a total reaction time of 12 hours). The product of this reaction is a milky white liquid having a RSV of 30 dl/g (1 M $NaNO_3$, 450 ppm, 30° C.).

An unmodified polymer polymerized without late addition of sodium hypophosphite (Polymer 25) is synthesized in a similar manner. The unmodified polymer has a RSV of 34 dl/g (1M $NaNO_3$, 450 ppm, 30° C.).

TABLE 23

Representative Anionic Acrylamide/Acrylic Acid Dispersion Polymers Modified Using Chain-Transfer Agents (prepared according to the method of Example 14)

| Polymer | Mole % Acrylic acid | Chain transfer agent | Level (ppm BOM) | Added at % conversion | RSV (dL/g) |
|---|---|---|---|---|---|
| 24 | 30 | Sodium hypophosphite | 250 | 80 | 30 |
| 25 | 30 | — | — | — | 34 |

TABLE 24

Retention and Drainage Performance of Polymers 24 and 25

| | % Turbidity Reduction[2] | |
|---|---|---|
| Dose[1] | Polymer 24 | Polymer 25 |
| 0.25 | 69.6 | 59.2 |
| 0.5 | 78.0 | 69.3 |
| 1.00 | 83.7 | 78.5 |

[1]Pounds polymer active per ton of slurry solids.
[2]Britt Jar testing, synthetic alkaline furnish.

POLYMERS MODIFIED WITH COMBINATIONS OF CROSSLINKER & CHAIN TRANSFER AGENTS

EXAMPLE 15

An AcAm/DMAEA-MCQ (90:10) copolymer lattice modified with a chain-transfer and cross-linking agent added during polymerization (Polymer 26) is synthesized as follows.

An aqueous monomer phase is made-up by stirring together 364.37 g of a 49.6% aqueous solution of acrylamide (Nalco Chemical Co., Naperville, Ill.), 175.20 g of water, 9.00 g of adipic acid, 27.00 g of NaCl, and 0.80 g of a 50% aqueous solution of NaOH until the components are in solution. To the resulting solution is added 67.90 g of a 80.3% solution of dimethylaminoethylacrylate methyl chloride quaternary salt (DMAEA.MCQ, CPS Chemical Co.; Old Bridge, N.J.) and 0.09 g of EDTA.4 Na$^+$ (Van Waters & Rogers, Geismar, La.). The pH of the resulting mixture is 3.8.

An oil phase is prepared by heating a mixture of 234.29 g of paraffmic oil (Isopar M, Exxon, Houston, Tex.), 13.5 g of Span-80 and 4.5 g of Tween-61 until the surfactants dissolve (54–57° C.). The oil phase is charged into a 2 L reactor. With vigorous stirring (900 rpm, 10 mm rod with a teflon paddle at the base and 6-blade turbine mounted 3-inches from the bottom), the monomer phase is added over 2 minutes. The resulting mixture is stirred for 30 minutes and heated to 45° C.

To the water-in-oil emulsion is added 0.200 g of AIBN and 0.027 g of AIVN. The polymerization is carried out under a N$_2$ atmosphere at 45° C. for 4 hours, then 70° C. for one hour. A 5 solution of 0.0059 g methylene bisacrylamide (25 ppm, Aldrich Chemical Company, Milwaukee, Wis.) and 0.1882 g sodium formate (800 ppm, Van Waters & Rogers, Geismar, La.) in 5.87 g water is added to the reaction mixture at a constant rate from 54–80% monomer conversion. The resulting polymer has a RSV of 22.7 dl/g (1M NaNO$_3$, 450 ppm, 30° C.).

EXAMPLE 16

An AcAm/DMAEA.MCQ (1:1) copolymer lattice modified with a chain-transfer and cross-linking agent added during polymerization (Polymer 27) is synthesized in the following manner.

An aqueous monomer phase is made-up by stirring together 130.1 lb of a 49.5% aqueous solution of acrylamide (Nalco Chemical Co., Naperville, Ill.), 180.6 lb of water, 8.0 lb of adipic acid, 24.0 lb of NaCl, and 0.7 lb of a 50% aqueous solution of NaOH until the components are in solution. To the resulting solution is added 219.5 lb of a 80.0% solution of dimethylaminoethylacrylate methyl chloride quaternary salt (DMAEA.MCQ, CPS Chemical Co.; Old Bridge, N.J.) and 0.2 lb of EDTA.4 Na$^+$ (Van Waters & Rogers, Geismar, La.). The pH of the resulting mixture is 3.8.

An oil phase is prepared by heating a mixture of 208.0 lb of paraffinic oil (Escaid 110, Exxon, Houston, Tex.), 7.2 lb of Span-80 and 15.2 lb of Tween-61 until the surfactants dissolved (54–57° C.) in a 100-gal reactor. A water-in-oil dispersion is made by adding the monomer phase to the oil phase and stirring for 30 minutes. To the water-in-oil dispersion is added 0.26 lb of AIBN and 0.04 lb of AIVN. The polymerization is carried out under a N$_2$ atmosphere at 42° C. A solution of 0.006 lb methylene bisacrylamide (25 ppm, Aldrich Chemical Company, Milwaukee, Wis.) and 0.192 lb sodium formate (800 ppm, Van Waters & Rogers, Geismar, La.) in 6.00 lb water is added to the reaction mixture at a constant rate from 11–82% monomer conversion. When the reaction appeared complete, the reaction mixture is heated at 75° C. for 1 hour. After cooling 14.4 lb of Alfonice 14–12 Nalco 60 is added to the dispersed polymer. Polymer 27 has a RSV of 8.8 dl/g (1M NaNO$_3$, 450 ppm, 30° C.).

Polymer 28 (Table 25) is synthesized in a similar manner.

TABLE 25

Representative Cationic AcAm/DMABA.MCQ Copolymers Modified Using Combinations of Chain Transfer Agent and Cross-linking Agent

| Polymer | Mole % DMAEA.MCQ | [MBA] ppm | [NaF] ppm | Added at (% Conversion) | RSV (dl/g) |
|---|---|---|---|---|---|
| 26 | 10 | 25 | 800 | 54–82 | 22.7 |
| 27 | 50 | 25 | 800 | 11–82 | 8.8 |
| 28 | 50 | 25 | 800 | 6–49 | 6.2 |
| 29[1] | 50 | 0 | 0 | — | 21.0 |

[1]50:50 mole percent AcAm/DMAEA.MCQ latex copolymer (Nalco Chemical Co., Naperville, IL).

EXAMPLE 17

To further demonstrate the superiority of the modified polymers, they are compared to polymers prepared according to the procedure of EP 374,458 as follows.

The three 10 mole % cationic copolymers of DMAEA.MCQ with acrylamide (Polymers 30, 31 and 32) shown in Table 26 are synthesized according to the procedure outlined in EP 374,458 at page 6, line 53, example 5 B. The polymers contain varying amounts of a branching (or cross-linking) and chain transfer agents.

TABLE 26

Representative Polymers Prepared as Described in EP 374,458

| Polymer | Chain transfer agent (1.5% Isopropanol) % | Branching or Cross-linking agent (Methylene bisacrylamide), ppm | Solubility Quotient, % |
|---|---|---|---|
| 30 | 3 | 8 | 33 |
| 31 | 9 | 8 | 36 |
| 32 | 18 | 8 | 52.5 |

The retention performance of Polymers 31 and 32, representative of the polymers described in EP 374,458, is compared to a modified polymer of this invention in Table 27 (Polymer 10). The results are presented in Table 27.

TABLE 27

Comparative Retention Performance of Modified and Unmodified Polymers

| | Polymeric Treatments | | |
|---|---|---|---|
| Dose[1] | Polymer 31 | Polymer 32 | Polymer 10 |
| 0.50 | 62.9% | 59.9% | 87.2% |
| 1.00 | 73.7% | 68.6% | 93.3% |

[1]Pounds active per ton of slurry solids, synthetic alkaline furnish.
[2]Percent turbidity reduction.

As shown in Table 27, as a flocculant alone, the polymers of EP 374,458 show significantly inferior retention performance to the modified polymers of this invention. The retention preformance of the polymers of EP 374,458 and a representative modified polymer of this invention in conjunction with bentonite in a microparticle program is shown in Table 28. This data shows the superiority of modified polymers of this invention over those disclosed in EP 374,458.

TABLE 28

Comparative Britt Jar Retention Performance (Turbidity reduction) of Modified and Unmodified Polymers

| Polymer Treatment/Dose[1] | Bentonite dose[1] | Retention, % |
|---|---|---|
| 10/1.0 | 1.0 | 88.0 |
| 31/1.0 | 1.0 | 61.6 |
| 32/1.0 | 1.0 | 57.8 |
| 10/1.0 | 3.0 | 95.1 |
| 31/1.0 | 3.0 | 65.1 |
| 32/1.0 | 3.0 | 63.5 |

[1]Pounds active per ton of slurry solids.

EXAMPLE 18

Polymer 33, a polymer of 20% polymer solids, 65/25/10 mole percent AcAm/DMAEA.BCQ/DMAEA.MCQ dispersion is synthesized in the following manner.

A 1500 ml reaction flask is fitted with a mechanical stirrer, thermocouple, condenser, nitrogen purge tube, and addition port. To this reactor is added 139 g of a 49.4% aqueous solution of acrylamide (Nalco Chemical Co., Naperville, Ill.), 134 g of dimethylaminoethylacrylate benzyl chloride quaternary salt (71.5% aqueous solution, Nalco Chemical Co., Naperville, Ill.), 36 g of dimethylaminoethylacrylate methyl chloride quaternary salt (80% aqueous solution, NCF Manufacturing, Riceboro, Ga.), 10 g of glycerin, 56 g of the copolymer of dimethylaminoethylacrylate benzyl chloride quaternary salt and diallyldimethylammonium chloride (15% aqueous solution, Nalco Chemical Co., Naperville, Ill.), 10 g of the homopolymer of dimethylaminoethylacrylate methyl chloride quaternary salt (15% aqueous solution, Nalco Chemical Co., Naperville, Ill.), 0.25 g of ethylenediaminetetraacetic acid, tetra sodium salt, 152 g of ammonium sulfate and 380 g of deionized water. The mixture is then heated to 48° C. while stirring at 700 rpm. After reaching 48° C., 2.0 g of a 1.0% aqueous solution of 2,2'-azobis(2-amidinopropane) dihydrochloride (V-50, Wako Chemicals of Dallas, Tex.) is added to the reaction mixture and the temperature is maintained at 48° C. throughout the reaction. Forty five minutes into the reaction (~10% monomer conversion) 2.5 g of a 10% aqueous solution of sodium formate is added to the reaction. Two hours after initiation 3.0 g of a 1.0% aqueous solution of 2,2'-azobis(2-amidinopropane) dihydrochloride is added to the reaction, and at four hours 4.0 g of a 10% aqueous solution of 2,2'-azobis(2-amidinopropane) dihydrochloride is added. At eight hours the reaction is returned to ambient temperature and 59.9 g of sodium sulfate, and 11.9 g acetic acid are added. The resulting product is a smooth milky white dispersion with a bulk viscosity of 100 cP having a RSV of 10.2 dl/g (0.125 N $NaNO_3$ solution at 0.045% polymer).

EXAMPLE 19

Polymer 34 is prepared according to the procedure of Example 18, except that MBA is added instead of sodium formate. At 80% monomer conversion, 2.0 g of a 0.1% aqueous methylene bisacrylamide solution is added. The resulting product is a smooth milky white dispersion having a bulk viscosity of 100 cP and a RSV of 9.5 dl/g (0.045% polymer in 0.125 N $NaNO_3$ solution).

EXAMPLE 20

Polymer 35 is prepared according to the procedure of Example 19, except sodium formate (2.5 g of 10% aqueous solution) is added to the monomer (0% conversion), and no methylene bisacrylamide is added. The resulting product is a smooth milky white dispersion having a bulk viscosity of 100 cP and a RSV of 12.1 dl/g (0.045% polymer in 0.125 N $NaNO_3$ solution).

EXAMPLE 21

Polymer 36 is prepared according to the procedure of Example 20, except that 2.0 g of a 0.1% aqueous solution of methylene bisacrylamide is added at 80% conversion. The resulting product is a smooth milky white dispersion having a bulk viscosity of 100 cP and a RSV of 12.0 dl/g (0.045% polymer in 0.125 N $NaNO_3$ solution).

EXAMPLE 22

A 10/90 mole % DMAEA.MCQ/AcAm dispersion polymer with methylenebisacrylamide and sodium formate added late in the polymerization (polymer 37) is prepared according to the method of Example 4, except that the amount of deionized water in the formula is reduced by 10.0 g, and instead of vinyltrimethoxysilane, a solution containing 0.0015 g of methylenebisacrylamide, 0.075 g sodium formate and 9.9235 g of deionized water is fed to the polymerization over 90 minutes, beginning at 1.5 hours after initiation. The resulting polymer product has a Brookfield viscosity of 300 cP (#3 spindle, 12 rpm) and a RSV of 18.5 dl/g at 450 ppm in 1 M $NaNO_3$.

TABLE 29

Cationic Dispersion Polymers Modified with Cross-linking agent and Chain Transfer Agents

| Polymer | AcAm (mole %) | DMAEA·MCQ (mole %) | DMAEA·BCQ (mole %) | Na formate (ppm) | Na formate added at | MBA (ppm) | MBA added at | RSV (dl/g) |
|---|---|---|---|---|---|---|---|---|
| 37 | 90 | 10 | — | 500 | 1.5–3 hours | 10 | 1.5–3 hours | 18.5 |
| 33 | 65 | 10 | 25 | 1275 | ~10% | 0 | NA | 10.2 |
| 34 | 65 | 10 | 25 | 1275 | ~10% | 10 | ~80% | 9.5 |
| 38 | 65 | 10 | 25 | 500 | 6–41% | 10 | 6–41% | 16.2 |
| 35 | 65 | 10 | 25 | 1000 | 0 | 0 | NA | 12.1 |
| 36 | 65 | 10 | 25 | 1000 | 0 | 10 | ~80% | 12 |
| 39[1] | 65 | 10 | 25 | 0 | NA | 0 | NA | 18 |
| 40[2] | 65 | 20 | 15 | 0 | NA | 0 | NA | 18 |
| 41 | 65 | 20 | 15 | 1275 | ~10% | 10 | t = 3 hr | 16.3 |

[1]Available from Nalco Chemical Company, Naperville, IL.
[2]Available from Derypol, S. A., Barcelona Spain.

TABLE 30

Retention Performance of Modified and Unmodified Polymers (in terms of percent turbidity reduction)

| Dosage lbs/ton | Polymer 7 | Polymer 37 |
|---|---|---|
| 0.3 | 66.3 | 70.9 |
| 0.6 | 78.5 | 81 |
| 1 | 88.8 | 89.5 |

EXAMPLE 23

High Shear Test for Dewatering

To illustrate that polymers prepared according to the procedure of Example 17 are less efficient than the structurally-modified polymers disclosed herein, some comparative testing is done as follows.

The polymer at the desired concentration is added to 200 ml of sludge from a Midwestern municipal facility and mixed using the Britt Jar impeller at 1200 rpm for 1 or 2 seconds depending on the sludge. The conditioned sludge is then poured through a belt filter press filter medium. The amount of water drained in 10 seconds is taken as a measure of the polymer performance, and a larger amount of drainage indicates better dewatering capabilities.

The sludge dewatering performance of the modified polymers are compared to their unmodified counterparts in Tables 31–34. For each example, higher drainage is obtained with the polymers modified according to the procedures described herein than with the equivalent unmodified polymer.

TABLE 31

Ten Second Free Drainage

| | Drainage, (ml) | |
|---|---|---|
| Dose, (ppm) | Polymer 29 | Polymer 28 |
| 29 | 40 | |
| 36 | 46 | |
| 43 | 50 | |
| 51 | 44 | 72 |
| 58 | | 94 |
| 65 | | 108 |
| 72 | | 112 |

TABLE 32

Ten Second Free Drainage Results

| | Drainage, (ml) | | | |
|---|---|---|---|---|
| Dose, (ppm) | Polymer 39 | Polymer 33 | Polymer 34 | Polymer 38 |
| 48 | | 68 | | |
| 58 | 68 | 78 | | 74 |
| 68 | 72 | 80 | 86 | 86 |
| 77 | 80 | 84 | 90 | 82 |
| 86 | 80 | | 98 | |
| 95 | | | 96 | |

TABLE 33

Ten Seconds Free Drainage Results

| | Drainage, (ml) | |
|---|---|---|
| Dose, (ppm) | Polymer 39 | Polymer 36 |
| 113 | 52 | 58 |
| 122 | 54 | 72 |
| 131 | 66 | 74 |
| 140 | 60 | 74 |

TABLE 34

Ten Seconds Free Drainage Results

| | Drainage, (ml) | |
|---|---|---|
| Dose (ppm) | Polymer 39 | Polymer 36 |
| 39 | 34 | |
| 49 | 54 | |
| 59 | 48 | 78 |
| 68 | | 86 |
| 77 | | 88 |

EXAMPLE 24
Procedure for Coal Refuse Slurry Laboratory Cylinder Seffling Test

Comparative flocculation preformance of an acrylamide/acrylic acid copolymer (70:30 mole %) modified by late addition of sodium hypophosphite (Polymer 24) and the corresponding unmodified polymer (Polymer 25) in a mining applications is done as follows.

A 5-gallon sample of coal refuse slurry is stirred constantly to ensure that the slurry is well dispersed. The slurry is then transferred to 500-ml graduated cylinders. Masking tape is placed on each of the 500-ml cylinders adjacent to the cylinder graduation marks. The initial level of the coal refuse slurry at time equal to zero (which is at the 500-ml mark of the graduated cylinder) is marked on the masking tape. Prior to each test the 500 ml-cylinder containing the coal refuse slurry is inverted several times to disperse any settled solids. The cylinder is then quickly dosed with the desired amount of a 0.12% polymer actives solution (flocculant) and inverted 4 times. The cylinder is then returned to the upright position and a timer is started. The position of the solids interface is monitored as a function of time (in seconds) by marking the level of the solids interface on the masking tape at the appropriate time interval. When the rate of descent of the solid interface begins to slow down the marking of the masking tape is ended. The settling rate (in inches/minute) of the coal refuse slurry for the free-fall region is calculated by dividing the distance of the solid interface from the initial level (in inches) by the elapsed time (in seconds). A faster settling rate indicates better performance

TABLE 35

Flocculation Performance of Polymers 24 and 25 in Mining Application

| | Settling Rate (in/min) | |
|---|---|---|
| Dose (ml)[1] | Polymer 24 | Polymer 25 |
| 7 | 5.4 | 2.6 |
| 9 | 8.1 | 4.2 |
| 11 | 10.5 | |
| 13 | | 7.0 |

[1]ml of a 0.12% polymer actives dispersion.

EXAMPLE 25

A 22.7% polymer solids, 70/30-mole percent acrylamide/acrylic dispersion polymer (Polymer 42) is synthesized in the following manner.

To a 1500 ml reaction flask fitted with a mechanical stirrer, thermocouple, condenser, nitrogen purge tube, addition port and heating tape is added a solution prepared by combining 356.6 g of deionized water, 64 g sodium sulfate, 84 g ammonium sulfate, 2.8 g sodium formate, 85.0 g of a 16% aqueous solution of poly(acrylamidomethylpropane-sulfonic acid/methacrylic acid) copolymer (Nalco Chemical Company, Naperville, Ill.) 329.6 g of a 48.4% aqueous solution of acrylamide (Nalco Chemical Company, Naperville, Ill.), 0.40 g of the tetrasodium salt of ethylene diamine tetracetic acid, 69.3 g acrylic acid (Rohm and Haas Texas, Inc., Deer Park, Tex.), and 4.0 g of a 50% aqueous solution of sodium hydroxide. The pH of the resulting mixture is 3.6. The monomer reaction solution is heated to 35° C. with thorough mixing. To the homogenous monomer reaction solution is added 1.0 g of a 1% aqueous solution of VA-044 (2,2'-Azobis (N,N'-dimethyleneisobutyramidine) dihydrochloride), Wako Chemicals USA, Inc., Richmond, Va.). The polymerization is carried out under $N_2$ atmosphere at 35° C. with thorough mixing. After a total reaction time of 6 hours, 2.0 g of a 1% aqueous solution of VA-044 is added to the reaction mixture. The reaction mixture is kept at 35° C. overnight. The next day, 2.0 g of a 10% aqueous solution of VA-044 is added, and the reaction temperature is maintained for another 2 hours before the reaction mixture is cooled and removed from the reactor. The product of this reaction is a milky white liquid (700 cP., RSV of 33.7 dl/g (1 M $NaNO_3$, 450 ppm, 30° C.).

EXAMPLE 26

A 22.7% polymer solids, 70/30 mole percent acrylamide/acrylic acid dispersion polymer modified with sodium formate (Polymer 43) is synthesized according to the procedure of Example 25. After a total 7 hours of reaction time (81% conversion), 2.8 g of sodium formate is added to the reaction mixture. The polymerization is then continued and finished as described in Example 25. The product of this reaction is a milky white liquid (570 cP., RSV of 30.8 dl/g in 1 M $NaNO_{3, 450}$ ppm, 30° C.).

TABLE 36

Flocculation Performance of Modified and Unmodified Anionic Dispersion Polymers

| | Performance[2] | |
|---|---|---|
| Dose[1] | Polymer 42 | Polymer 43 |
| 0.25 | 44 | 56 |
| 0.50 | 59 | 63 |
| 1.0 | 69 | 81 |
| 1.5 | 73 | 95 |

[1]Pounds polymer actives per ton of slurry solids.
[2]Change in peak mean chord length; synthetic alkaline furnish.

What is claimed is:

1. A structurally-modified nonionic, cationic or anionic water-soluble polymer, the polymer comprising a mixture of linear polymer and long-chain branched polymer, said polymer mixture having a reduced specific viscosity above 3 dl/g, wherein the polymer is prepared by initiating polymerization of an aqueous solution of monomers under free radical polymerization conditions to form a polymer solution and adding at least one structural modifier to the polymer solution after at least 30% polymerization of the monomers has occurred.

2. The structurally-modified water-soluble polymer according to claim 1 selected from the group consisting of emulsion polymers, dispersion polymers and gel polymers.

3. The structurally-modified nonionic, cationic or anionic structurally-modified water-soluble polymer according to claim 1 wherein the monomers are selected from the group consisting of acrylamide, methacrylamide, diallyldimethylammonium chloride, dimethylaminoethyl acrylate methyl chloride quaternary salt, acrylamidopropyltrimethylammonium chloride, dimethylaminoethyl methacrylate methyl chloride quaternary salt, methacrylamidopropyltrimethylammonium chloride, acrylic acid, sodium acrylate, ammonium acrylate, methacrylic acid, sodium methacrylate, and ammonium methacrylate.

4. The structurally-modified water-soluble polymer of claim 1 wherein the structural modifier is selected from the group consisting of cross-linking agents, chain transfer agents and mixtures thereof.

5. The structurally-modified water-soluble polymer of claim 4 wherein the chain transfer agents are selected from the group consisting of alcohols, sulfur compounds, carboxylic acids or salts thereof, phosphites, and combinations thereof.

6. The structurally-modified water-soluble polymer of claim 5 wherein the chain transfer agents are selected from sodium formate and sodium hypophosphite.

7. The structurally-modified water-soluble polymer of claim 1 wherein the monomers are acrylamide and dimethylaminoethylacrylate methyl chloride quaternary salt and the structural modifier is sodium hypophosphite.

8. A method of preparing a structurally-modified nonionic, cationic or anionic water-soluble polymer, the polymer comprising a mixture of linear polymer and long-chain branched polymer, said polymer mixture having a reduced specific viscosity above 3 dl/g, comprising initiating polymerization of an aqueous solution of monomers under free radical polymerization conditions to form a polymer solution and adding at least one structural modifier to the polymer solution after at least 30% polymerization of the monomers has occurred.

* * * * *